United States Patent
Bergmann (10) Patent No.: US 11,430,159 B2
(45) Date of Patent: Aug. 30, 2022

(54) METHOD FOR RENDERING VISIBLE SECURITY INFORMATION OF A DIGITALLY STORED IMAGE, AND IMAGE REPRODUCTION DEVICE FOR CARRYING OUT SUCH A METHOD

(71) Applicant: Muehlbauer GmbH & Co. KG, Roding (DE)

(72) Inventor: Mike Bergmann, Dresden (DE)

(73) Assignee: MUEHLBAUER GMBH & CO. KG, Roding (DE)

( * ) Notice: Subject to any disclaimer, the term of this patent is extended or adjusted under 35 U.S.C. 154(b) by 0 days.

(21) Appl. No.: 17/155,331

(22) Filed: Jan. 22, 2021

(65) Prior Publication Data
US 2021/0233289 A1 Jul. 29, 2021

(30) Foreign Application Priority Data
Jan. 28, 2020 (DE) .......................... 102020000512.8

(51) Int. Cl.
| G06T 11/00 | (2006.01) |
| G06T 7/90 | (2017.01) |
| G06T 3/40 | (2006.01) |
| G06F 21/44 | (2013.01) |
| G06K 19/06 | (2006.01) |
| G06K 9/00 | (2022.01) |
| G06T 1/00 | (2006.01) |
| G06F 21/16 | (2013.01) |

(Continued)

(52) U.S. Cl.
CPC ............ G06T 11/001 (2013.01); G06F 21/44 (2013.01); G06K 19/0614 (2013.01); G06T 3/40 (2013.01); G06T 7/90 (2017.01); G06V 40/33 (2022.01)

(58) Field of Classification Search
CPC combination set(s) only.
See application file for complete search history.

(56) References Cited

U.S. PATENT DOCUMENTS 10,331,291 B1   6/2019   Poder et al.
11,124,009 B2 * 9/2021   Ederer ................ B42D 25/305

FOREIGN PATENT DOCUMENTS

DE   102009036706 B3   5/2011
DE   102012108062 A1   3/2014

(Continued)

*Primary Examiner* — Wesner Sajous
(74) *Attorney, Agent, or Firm* — John A. Miller; Shumaker, Loop & Kendrick, LLP (57) ABSTRACT

A method for rendering visible security information of a digitally stored image which has a plurality of pixels and at least one piece of digitally coded information comprises at least the following steps:
  allocating at least some of the pixels to at least one image region;
  determining an average color value of the pixels allocated to the image region;
  determining two mutually complementary color values whose average color value is at least approximately identical to the determined average color value of the pixels allocated to the image region;
  depicting the image region and at least part of the digitally coded security information in a visually perceptible manner.

The depicted image region thereby has a first of the mutually complementary color values. The part of the digitally coded security information is depicted within the image region and has a second of the mutually complementary color values.

10 Claims, 6 Drawing Sheets

(51) Int. Cl.
*H04N 1/60* (2006.01)
*H04N 1/32* (2006.01)
*G06V 40/30* (2022.01)

(56) References Cited

FOREIGN PATENT DOCUMENTS

| | | | | |
|---|---|---|---|---|
| DE | 102016221700 A1 | 5/2018 | | |
| EP | 1349368 A1 | 10/2003 | | |
| EP | 2100747 A1 | 9/2009 | | |
| WO | 2018045326 A1 | 3/2018 | | |
| WO | WO2018045326 | * | 3/2018 | ............ G06F 21/36 |

* cited by examiner

METHOD FOR RENDERING VISIBLE SECURITY INFORMATION OF A DIGITALLY STORED IMAGE, AND IMAGE REPRODUCTION DEVICE FOR CARRYING OUT SUCH A METHOD

CROSS-REFERENCE TO RELATED APPLICATION

This application claims priority to German Patent Application Serial No. 10 2020 000 512.8 filed Jan. 28, 2020.

BACKGROUND

Field

Disclosed herein are a method and an apparatus for rendering visible security information of a digitally stored image. Features and details of the method and of the apparatus are also disclosed in the patent claims and by this description and the figures.

Discussion of the Related Art

Security documents such as, for example, identity cards or visual inlays for security documents are equipped with security elements which have visually perceptible security features, for example holograms or symbols that are visible only when illuminated with light of a specific wavelength (for example UV light). These security elements can be capable of being verified with the naked eye, by means of auxiliary devices such as loupes or magnifiers or—in the case of "hidden" security elements—with the aid of specialist knowledge.

In the case of the use of digitally stored (identity) images, for example for an identity function of a smartphone, of a personal digital assistant (PDA) or of a handheld device, special security images can be stored, which, as well as having a large number of pixels each having associated color values, also have additional digitally coded security information. This digitally coded security information can include, for example, a name, a date of birth or other personal information of a person shown or depicted by the stored security image and is in most cases not visibly depicted. By automatically or manually comparing the digitally coded security information with, for example, control data stored in a database, the integrity or authenticity of the digitally stored (identity) image can be checked. Furthermore, unauthorized replication of the digitally stored (identity) image can be detected by comparing the digitally coded security information since, for example, although a copy or photograph of the digitally stored (identity) image may possibly contain an identical reproduction of the pixels, it cannot contain the digitally coded security information (which is not depicted in a visually perceptible manner).

The reading and comparison of the digitally coded security information conventionally takes place by control devices specially provided for that purpose and/or by means of software specially adapted for that purpose. Furthermore, a network connection to a database with stored control data is conventionally necessary. However, such special devices are very expensive, for example for smaller retailers, and network connections, for example in rural areas, are not extensively available. Even a network connection by means of radio technology can be problematic, for example in enclosed sales areas.

However, specifically for smaller retailers such as, for example, kiosk or refreshment stand operators, it is regularly necessary in day to day business operations to establish the identity and/or identity features, such as, for example, the age, of a person, for example when providing food and drink containing tobacco or alcohol. It would thereby be advantageous—despite the absence of a network connection and without special readers—to check a digital identity card and/or a digitally stored image that is presented at least for the presence of plausible security features.

Accordingly, the technical problem is to provide a method and an apparatus which in each case allow security information of a digitally stored (identity) image to be rendered visible, wherein neither a network connection nor any technical or additional apparatuses other than a display device (e.g. a smartphone) for displaying the (identity) image are to be necessary for that purpose.

Document WO 2018/045326 A1 discloses a method for rendering visible data associated with a person on a smartphone for a digital identity function, wherein the digital identity function also includes the display of a digitally stored image.

Document U.S. Pat. No. 10,331,291 B1 likewise relates to a digital identification method or a digital identification which, however, requires a connection to an ID server.

Accordingly, despite existing methods and apparatuses, there continues to be a need for a solution to the stated technical problem.

SUMMARY

The stated technical problem is solved by a method as claimed in claim 1 and an apparatus as claimed in the further independent claim. Advantageous embodiments are defined by the further claims.

A method for rendering visible security information of a digitally stored image which has a plurality of pixels and at least one piece of digitally coded security information comprises at least the following steps:

- allocating at least some of the pixels to at least one image region;
- determining an average color value of the pixels allocated to the image region;
- determining two mutually complementary color values whose average color value is at least approximately identical to the determined average color value of the pixels allocated to the image region; and
- depicting the image region and at least part of the digitally coded security information in a visually perceptible manner.

The depicted image region thereby has a first of the mutually complementary color values. The part of the digitally coded security information is depicted within the image region and has a second of the mutually complementary color values.

An image region within the meaning of this disclosure denotes a two-dimensional (sub-)region or part of a two-dimensional image or a three-dimensional (sub-)region or part of a three-dimensional image. If more than one pixel is allocated to an image region, then it is a requirement for this allocation that each of the pixels allocated to a particular image region adjoins at least one further of the pixels that are allocated or that are to be allocated to that particular image region. Two pixels adjoin when they are arranged adjacent to one another within the image in any spatial dimension and there is no further pixel of the image between the pixels arranged adjacent to one another. In a variant, an image region can also be identical to a (full) image, so that all the pixels of an image are allocated to a single image region.

A color value within the meaning of this disclosure denotes a value on a color scale, for example the RAL scale, the RGB scale, the YMC scale or a software-specific color scale which is associated with a particular color shade. Each pixel of a digitally stored image has a color value, which in particular can be given as a whole-numbered numerical value, which identifies the color shade of the pixel.

An average color value within the meaning of this disclosure is a color value which can correspond to the arithmetic mean of the color values to be averaged. If the color scale contains only whole-numbered color values, then the average color value in the case of an arithmetic mean of color values to be averaged that is not a whole number can be determined by rounding up or rounding down the arithmetic mean of the color values to be averaged.

Depending on the color scale, two colors can be complementary to one another when, for example, the addition of their color values corresponds to a maximum value of the color scale used.

Two color values are approximately identical when they differ from one another by only one color value on the color scale. When using particular color scales, it can happen that the requirement for two color values which are to be complementary to one another and thereby correspond to a predetermined average color value cannot be met, at least not arithmetically exactly. Within the meaning of this disclosure, the expression "approximately identical color values" is therefore defined as meaning "color values which differ from one another by not more than one (whole-numbered) value on a color scale that is used".

Optionally, the method for rendering visible security information of a digitally stored image which has a plurality of pixels and at least one piece of digitally coded security information can comprise at least one of the following steps:
  depicting the digitally stored image in a visually perceptible manner by means of an image reproduction device; and/or
  instigating the rendering visible of security information by an operator of the image reproduction device, in particular by means of an interaction of the operator with the image reproduction device; and/or
  depicting part of the digitally stored image on an enlarged scale.

An advantage of the disclosed method for rendering visible security information of a digitally stored image which has a plurality of pixels and at least one piece of digitally coded security information is that no network connection and/or no additional device is required for this purpose. Instead, it is sufficient to depict the digitally stored image using an image reproduction device, for example using a smartphone, a personal digital assistant (PDA) or a handheld device. In order to check the security features, the digitally coded security information or part thereof can be rendered visible or shown within the image or within one or more regions of the image, for example instigated by a gesture and/or the operation of a button by a user or operator of the image reproduction device. In other words, the digitally stored image reproduced by the image reproduction device can be changed in response to an interaction of the operator of the image reproduction device in such a manner that security information contained in the digitally stored image becomes visible to a viewer of the image. In order to be able to look more closely at individual image regions, part of the digitally stored image can optionally be depicted on an enlarged scale. The enlarged depiction of the part of the image can likewise be instigated by an operator of the image reproduction device.

Optionally, at least part of the digitally coded security information can be depicted/displayed in the form of a visually perceptible letter and/or in the form of a visually perceptible number. Furthermore, at least part of the digitally coded security information can be depicted in the form of a visually perceptible symbol image and/or in the form of a visually perceptible pictogram.

A depiction of security information in an image region defines a reproduction or display, which is perceptible for a viewer/operator of the image, of the security information by some of the pixels which were allocated beforehand to the image region. In other words, some of the pixels which were allocated beforehand to the image region can now be used for the visually perceptible depiction/display of part of the security information, wherein at least those pixels of the image region that are not used for the reproduction of part of the security information now have the first of the mutually complementary color values. As a result, the part of the security information that is depicted is apparent in a visually perceptible manner within the image region.

In a variant, a symbol image which can be part of the digitally coded security information can be, for example, a scaled-down copy of the digitally stored (full) image. In this case, the scaled-down copy of the (full) image can be depicted in a visually perceptible manner in the image region as part of the security information, wherein the scaled-down full image has at least in part the second of the two mutually complementary color values.

Optionally, each pixel of a digitally stored image can be allocated to an image region. Furthermore, the same number of pixels does not necessarily have to be allocated to the image regions. Furthermore, some pixels can also be allocated to a plurality of image regions. In another variant, the pixels can each be allocated to only a single image region, so that the allocation of the pixels to a particular image region is biunique.

There can be allocated to an image region, for example, in each case 10, 100 or 1000 pixels. In particular, an image region can also contain any whole-numbered multiple of the above-mentioned examples of the number of pixels. For example, at least some of the image regions can have a longitudinal extent which in each case is at least approximately identical (+/−1 pixel) to the extent in terms of width of the respective image regions. An image region of a two-dimensional image can contain, for example, 10×10 or 100×100 pixels, wherein each of the pixels adjoins at least one further pixel of the image region. In other words, a two-dimensional image region can have the outline of a square or rectangle.

In a variant, a piece of security information which contains text information, or letters and/or numbers and/or symbols, can be depicted in such a manner that in each case a letter or a number or a symbol of the security information is depicted in one of a plurality of image regions, so that, in the—optionally enlarged—depiction of the plurality of image regions, readable or visually perceptible text information is obtained for the observer of the image regions.

In a variant, in particular in the case of a further enlarged depiction of individual or a plurality of image regions, closed letters and/or numbers and/or symbols, in particular 0, O, D, Q, Ö and/or @, can be replaced by a scaled-down copy of the digitally stored (full) image. As a result, manipulation, in particular unauthorized manipulation, of the digitally stored image is made more difficult.

In a further development, the method can comprise at least one of the following steps:
- allocating at least some of the pixels to a signature image region;
- determining a signature profile or line profile within the signature image region; and/or
- depicting the signature image region and at least part of the digitally coded security information in a visually perceptible manner within the signature image region.

The part of the digitally coded security information that is depicted within the signature image region can contain a plurality of visually perceptible letters and/or numbers and/or pictograms and/or symbol images. The plurality of visually perceptible letters and/or numbers and/or pictograms and/or symbol images can be arranged within the signature image region so as to follow the signature profile or line profile.

A "signature profile or line profile" is hereby defined as the (almost) continuous profile, or the direction of spread of a (signature) line depicted in the signature image region. In other words, a sequence of characters or symbols which is arranged so as to follow a signature profile or line profile reproduces the profile, or the (two-dimensional) shape, of a (signature) line.

Optionally, the allocation of the pixels to the signature image region can comprise a contrast analysis of the digitally stored image. By determining a contrast profile, it is possible to determine which part of an image is to be allocated to the signature image region. In particular, a black or almost black line (or sequence of adjoining pixels) against a white or almost white background can be allocated to the signature image region.

Furthermore, the determination of the signature profile or line profile can comprise a contrast analysis of the signature image region.

Optionally, the part of the security information that is depicted within the signature image region can have a color value which is complementary to a color value of a signature and/or fingerprint depiction that is depicted within the signature image region.

In a variant, the part of the security information that is depicted within the signature image region can overlie a signature and/or fingerprint depiction that is depicted within the signature image region. In other words, at least part of the digitally coded security information within the signature image region partially covers/overlies the signature profile or line profile. In particular, a plurality of visually perceptible letters and/or numbers and/or pictograms and/or symbol images can be depicted with pixels which overlie/cover a (signature) line in a visually perceptible manner. For example, part of the digitally coded security information can be apparent in a visually perceptible manner in the form of a sequence of letters or numbers having color values that are complementary to the (signature) lines, wherein the profile of the sequence of letters or numbers at least partially overlies the profile of the (signature) line.

In an alternative or additional further development of the method, at least part of the digitally coded security information can be displayed in an information image region. The part of the digitally coded security information that is depicted within the information image region can contain a plurality of visually perceptible letters and/or numbers and/or pictograms and/or symbol images.

The information image region can be displayed/depicted or made visible in a visually perceptible manner as part of the digitally stored image or also in addition to/as well as the digitally stored image that is depicted. For example, the information image region can frame a depiction of the digitally stored image.

Optionally, the information image region and/or the part of the digitally coded security information that is depicted within the information image region can have a plurality of color values, in particular color values that are mutually complementary in pairs.

Furthermore, the part of the digitally coded security information that is depicted within the information image region can be changed in a time-dependent and/or operator-instigated manner. In particular, the color values of the information image region and/or of the part of the digitally coded security information that is depicted within the information image region can be changed in a time-dependent and/or operator-instigated manner.

In a variant, the part of the digitally coded security information that is depicted within the information image region can be made visible or displayed/depicted in the form of a virtually endlessly repeating series of letters, numbers, pictograms and/or symbol images, wherein the series, from the perspective of a viewer or operator of the reproduction device, moves through or circulates around the information image region. The virtually endlessly repeating series of letters, numbers, pictograms and/or symbol images can thereby be slowed down, stopped or accelerated by an operator of the reproduction device. Furthermore, the color values of the information image region and/or of the part of the digitally coded security information that is depicted within the information image region can be changed in dependence on or independently of the part of the digitally coded security information that is depicted and/or an operator interaction with the reproduction device.

Optionally, the depiction of letters, characters, pictograms, symbols and/or images can, analogously to the information image region, also be changed in a time-dependent and/or operator-instigated manner in the signature image region and/or in at least one or more image regions. Furthermore, it can be provided that a time-dependent and/or operator-instigated change of a background color value is possible or is not possible for the signature image region and/or for at least one or more image regions.

The digitally coded security information can contain, for example, a date of birth, an address and/or further personal information/features such as gender, height, hair color, eye color. Furthermore, the digitally coded security information can include indications which give information about particular entitlements of a person shown by the digitally stored image.

Furthermore, the digitally coded security information, in particular the part of the security information that is depicted in the at least one image region and/or in the signature image region and/or in the information image region, can include time information, in particular current time information. For example, the current date and/or the current time of day can be depicted in the at least one image region and/or in the signature image region and/or in the information image region.

An advantage thereby is that a reproduction reproduced by filming or in another unauthorized manner of digitally coded security information depicted in the past can easily be identified. The reproduction device can have for this purpose a corresponding dating unit or can be adapted to determine the current date and/or the current time of day.

In a variant, both for the signature image region and for the information image region, in particular in the case of an enlarged depiction of the signature image region and/or of the information image region and/or of part of the signature image region and/or of part of the information image region, closed letters and/or numbers and/or symbols, in particular 0, O, D, Q, Ö and/or @, can be replaced by a scaled-down copy of the digitally stored (full) image. As a result, manipulation, in particular unauthorized manipulation, of the digitally stored image is made more difficult.

An image reproduction device disclosed herein is configured and adapted to reproduce a digitally stored image which has a plurality of pixels and at least one piece of digitally coded security information in a visually perceptible manner for an operator and to reproduce at least part of the digitally coded security information in a visually perceptible manner for an operator by means of a method disclosed herein.

BRIEF DESCRIPTION OF THE DRAWINGS

FIGS. 1 to 5 serve for better understanding of the methods described hereinbefore and of the apparatus described hereinbefore and in each case show examples thereof.

Although the figures show examples of the disclosed subject-matter only schematically and not to scale, the features described in the following and shown by the figures are part of the disclosure and can be combined with the features of the claims, of the methods described hereinbefore and of the apparatus described hereinbefore.

The figures herein are incorporated into the description and constitute a part of the description, illustrate embodiments consistent with the present disclosure, and serve to explain the principles of the present disclosure together with the description.

DETAILED DESCRIPTION OF THE EMBODIMENTS

The following further describes the present disclosure in detail by specific embodiments with reference to the accompanying drawings.

The figures are described in greater detail in the following. Unless explicitly indicated otherwise, the reference numerals used repeatedly in the figures in each case denote apparatus elements of the subject-matter shown that are identical or have the same effect.

Figure 1:
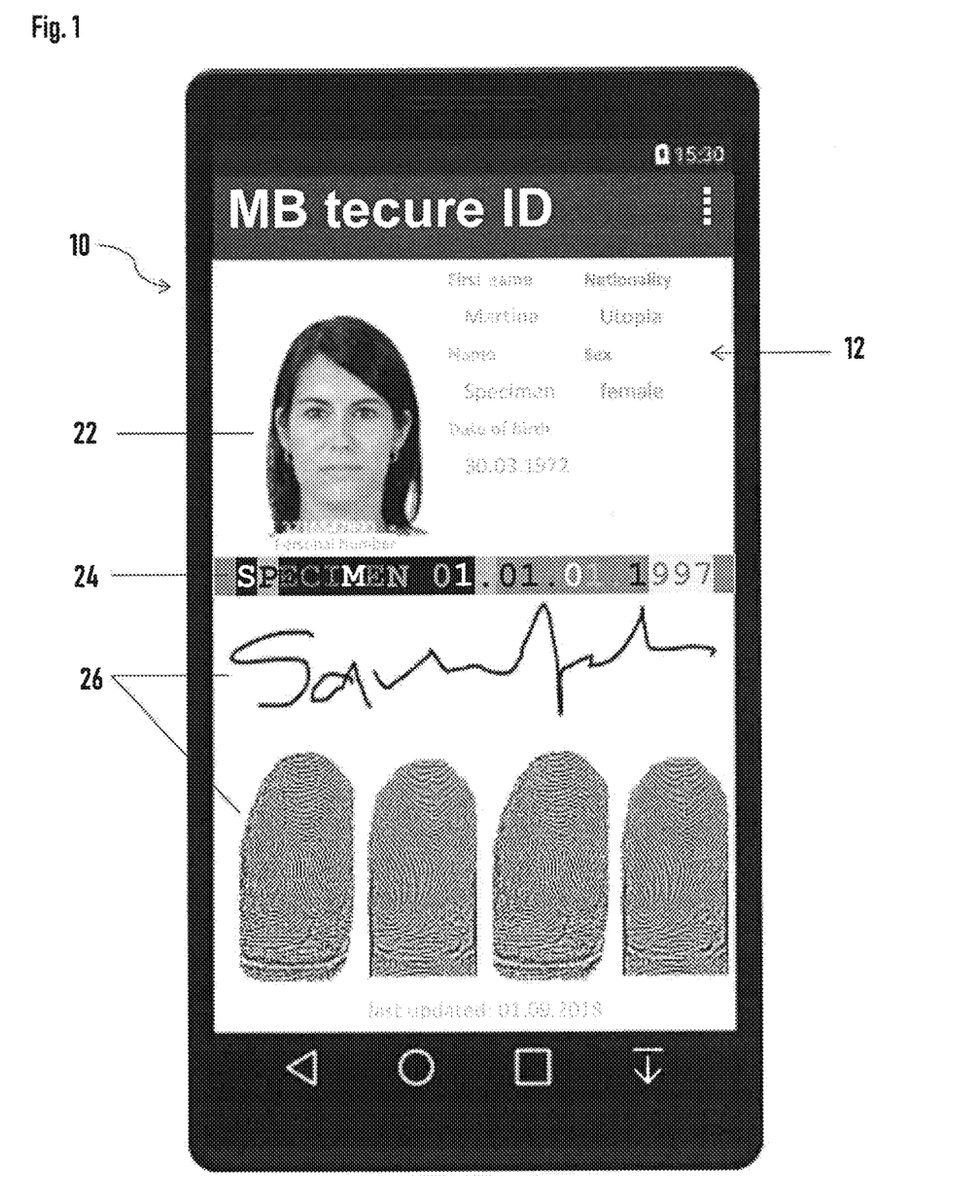
FIG. 1 shows, schematically, an example of an image reproduction device which depicts in a visually perceptible manner a digitally stored image having a plurality of pixels and a piece of digitally coded security information.

FIG. 1 shows, schematically, an example of an image reproduction device 10, which can be, for example, a smartphone. The image reproduction device 10 shown comprises a memory for storing a digital image having digitally coded security information. The image reproduction device further comprises a processor unit CPU.

The image reproduction device 10 shown further has a touch-sensitive display element 12 (touchscreen), which is adapted to reproduce in a visually perceptible manner the digitally stored image and the digitally coded security information. The image reproduction device 10 shown further comprises button elements, which are connected to the CPU and are adapted to transmit an interaction signal instigated by an operator of the image reproduction device to the CPU. In the example shown, the button elements are arranged beneath the display element 12. The touch-sensitive display element 12 is also configured and adapted to transmit an interaction signal instigated by the operator of the image reproduction device to the processor unit CPU.

FIG. 1 shows, schematically, an example of a visually perceptible depiction of a digitally stored image, concretely the portrait 22 of an individual and the signature and fingerprints 26 thereof, by the touch-sensitive display element 12 of the image reproduction device 10. The touch-sensitive display element 12 further depicts in a visually perceptible manner also personal information or security data in an information image region 24.

If the integrity of the depicted individual portrait 22 is to be checked, part of the digitally coded security information of the stored image can be depicted or displayed in a visually perceptible manner within the individual portrait 22, for example instigated by a predetermined gesture of the operator of the image reproduction device 10 on the touch-sensitive display element 12 and/or by operation of one of the button elements.

For this purpose, the processor unit CPU determines a plurality of image regions of the digitally stored image, or of the part of the image that is allocated to the individual portrait 22. The size or dimensions of the respective image regions can be permanently defined or can be determined by the processor unit CPU in dependence on the degree of enlargement of a depicted part of the digitally stored image. Optionally, the operator of the image reproduction device 10 can choose or influence the size or dimensions of the respective image regions.

Figure 2A:
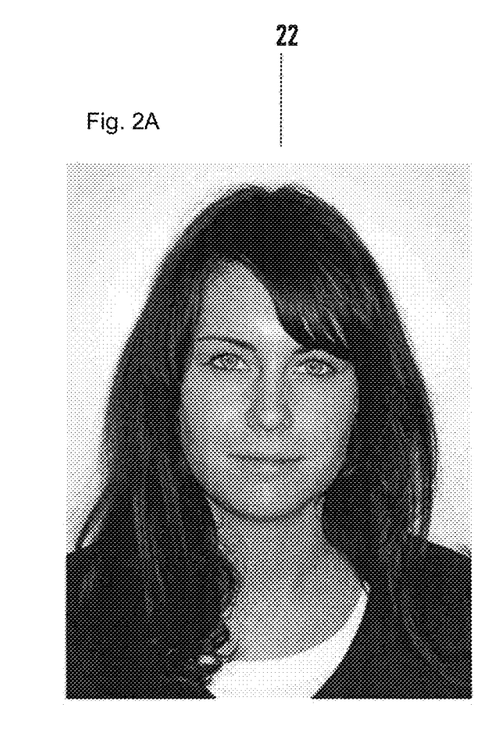
FIGS. 2A, 2B, and 2C show, schematically, examples of a digitally stored image re-produced in a visually perceptible manner, and of image regions.
Figure 2B:
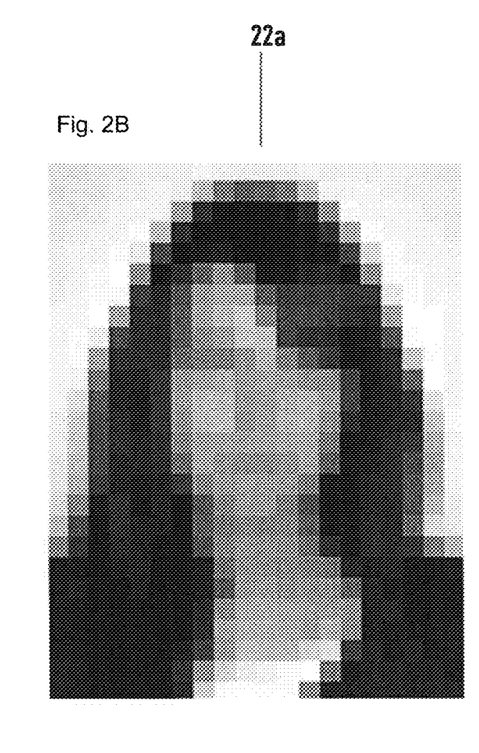
Figure 2C:
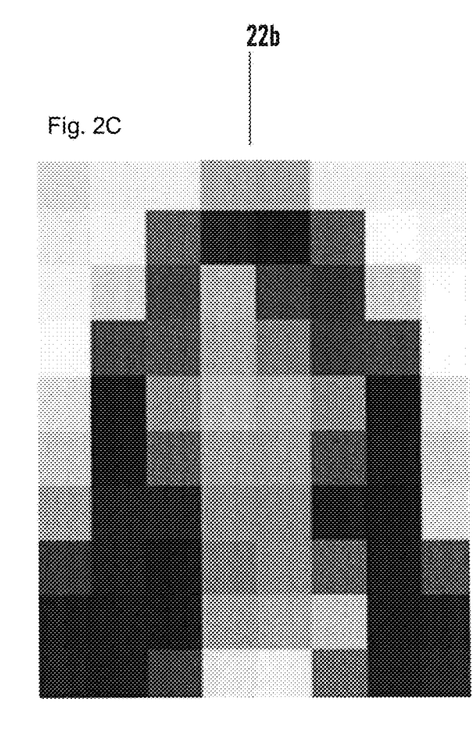

FIGS. 2B and 2C show examples 22a, 22b of the allocation of pixels of the individual portrait 22 of FIG. 2A to a plurality of image regions.

The processor unit CPU allocates the pixels of the digitally stored image to in each case one of the image regions and determines an average color value of the pixels allocated to the image region. The processor unit CPU further determines two mutually complementary color values for each image region, the color value of which is at least approximately identical (+/−1 whole-numbered color value on the color scale used by the image reproduction unit) to the determined average color value of the pixels allocated to the respective image region.

The processor unit CPU then instigates the visually perceptible depiction of the respective image regions. The depicted image regions are in each case depicted with a first of the respective determined mutually complementary color values for the respective image regions.

FIGS. 2B and 2C show examples 22a, 22b of the allocation of pixels of the individual portrait 22 of FIG. 2A to the respective image regions and the display of the respective image regions with the first of the respective determined mutually complementary color values for the respective image regions.

Figure 3A:
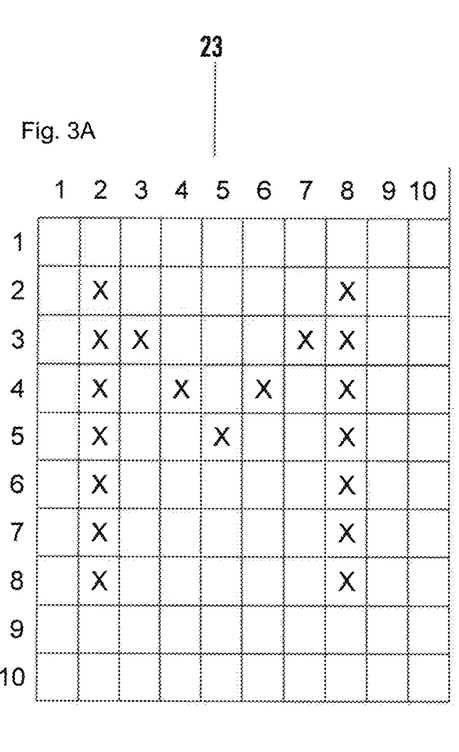
FIGS. 3A, 3B, and 3C show examples of a depiction of part of the digitally stored security information in image regions of the digitally stored image.
Figure 3B:
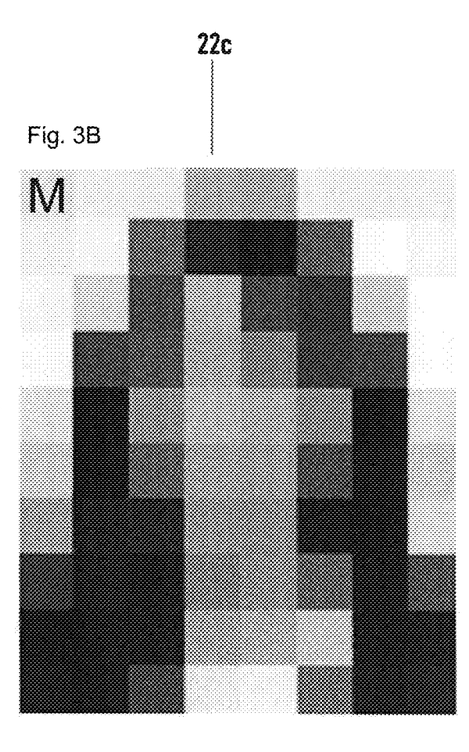
Figure 3C:
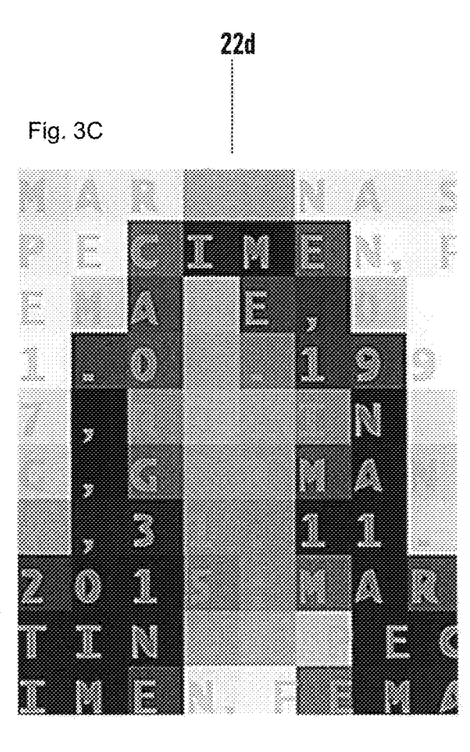

FIGS. 3A, 3B, and 3C show how part of the digitally coded security information can be depicted within one or more image regions. For example, a letter, a number, a pictogram or a symbol image can be allocated or assigned by the CPU to in each case one of the image regions and can be displayed or depicted in a visually perceptible manner within that image region. For this purpose, a plurality of pixels of an image region 23, for example of an image region of 10×10 pixels as shown in FIG. 3A, can be used for the depiction or display.

Once part of the digitally coded security information has been assigned or allocated to a particular image region, the respective depicted part of the digitally coded security information is depicted within the image region with the respective second of the respective mutually complementary color values determined for the respective image regions. As a result, the depicted parts of the security information are readily visible.

FIG. 3B shows the example 22c of the depiction of the letter "M" within an image region of the individual portrait 22, wherein the depicted letter "M", which is part of the digitally coded security information, is depicted with a color value that is complementary to the image region.

Furthermore, scaled-down copies of the individual portrait 22 can also be depicted in the image regions, for example instead of closed letters and/or numbers and/or symbols such as 0, O, D, Q, Ö and/or @, which are part of the digitally coded security information. Example 22d of FIG. 3C shows such a depiction of part of the digitally coded security information with scaled-down copies of the individual portrait 22.

As a result of the, in particular operator-instigated, depiction of the digitally coded security information of a digitally stored image, it is possible to check, without external readers and/or a network connection, whether the individual portrait depicted with the image reproduction device 10 is authentic or whether it is a forgery, in particular a copied image. The depicted part of the digitally coded security information can reproduce for an operator or viewer of the depicted image, for example, a name, an address, a date of birth or other personal information or features.

FIGS. 4A, 4B, 4C, and 4D show examples of the depiction of part of the digitally coded security information in a signature image region of the digital image depicted with the image reproduction device 10.

If the integrity of a depicted signature line or fingerprint line 26 is to be checked, part of the digitally coded security information of the stored image can be depicted or displayed in a visually perceptible manner within the signature image region, for example likewise instigated by a predetermined gesture of the operator of the image reproduction device 10 on the touch-sensitive display element 12.

For this purpose, the processor unit CPU determines a profile of the signature line or fingerprint line 26 and instigates the depiction of part of the digitally coded security information, for example a sequence of letters and/or numbers which can be arranged so as to follow and/or at least partly overlie the profile of the signature line or fingerprint line 26.

Figure 4A:
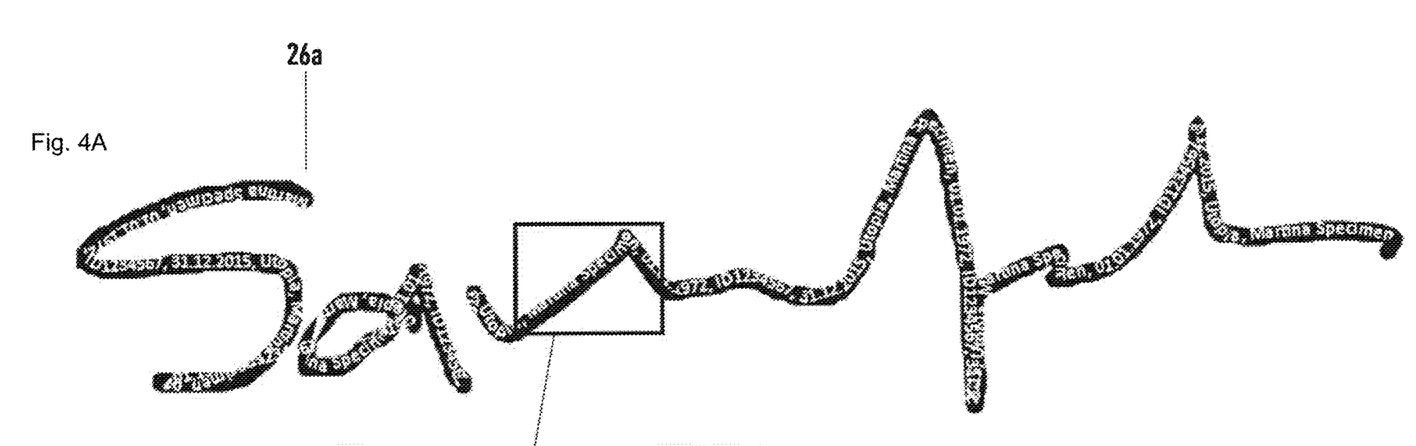
FIGS. 4A, 4B, 4C and 4D show examples of a depiction of part of the digitally stored security information in a signature image region of a digitally stored image.
Figure 4B:
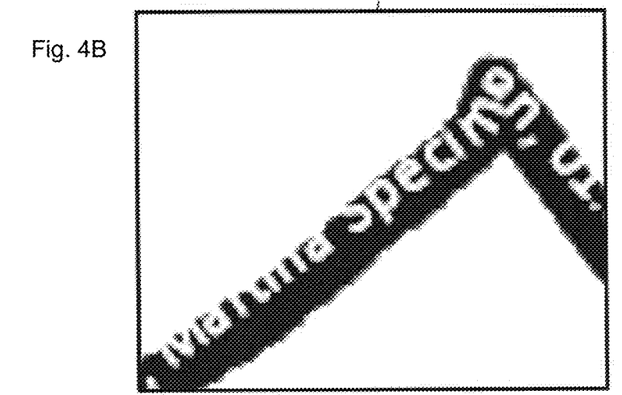

In the example shown in FIGS. 4A and 4B, part of the digitally coded security information is depicted or displayed in each case so as to follow the profile of a signature line 26a, wherein the security information is depicted/displayed with a color value that is complementary to the color value of the signature line. The depicted part of the security information thereby partially overlies the depicted signature line 26a.

Figure 4C:
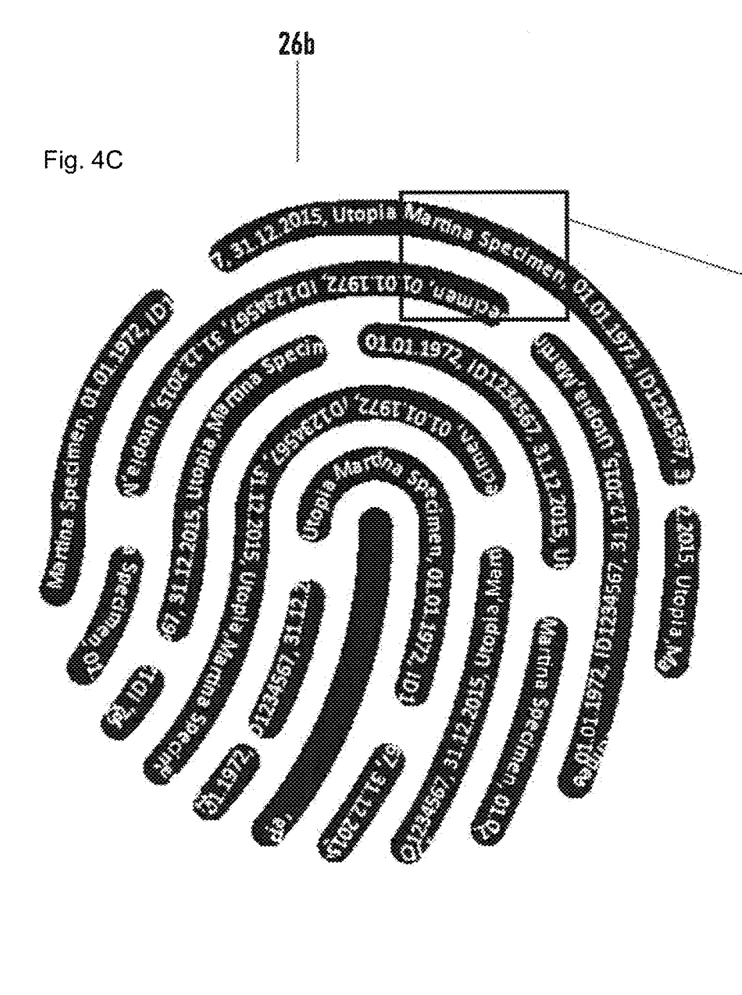
Figure 4D:
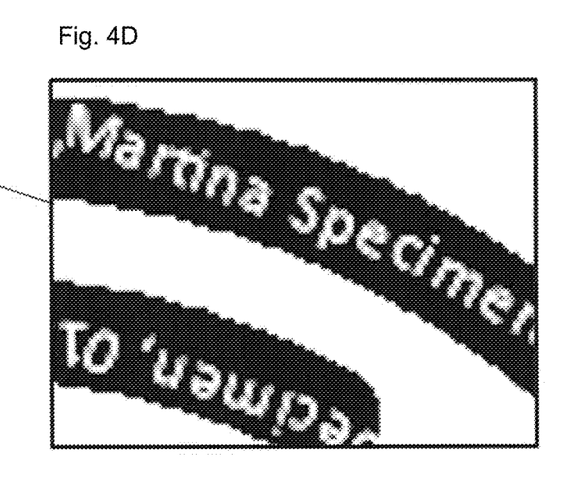

FIGS. 4C and 4D further show an example of a depicted part of the digitally coded security information which is depicted/displayed so as to follow the profile of a fingerprint line 26b and thereby partially overlies the depicted fingerprint line 26b. The part of the security information is depicted/displayed in the example shown with a color value that is complementary to the color value of the fingerprint line 26b.

Analogously to the depiction of part of the security information in the image regions of the individual portrait 22, the part of the security information that is displayed in the signature image region of the digitally stored image can reproduce personal information or features.

Figure 5A:
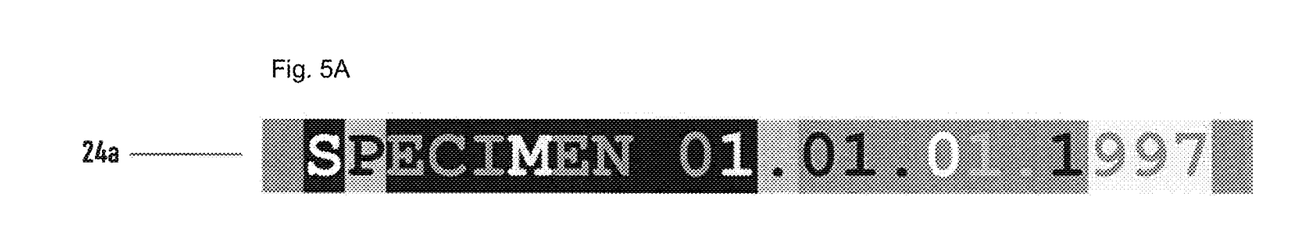
FIGS. 5A and 5B show examples of a depiction of part of the digitally stored security information in an information image region.
Figure 5B:
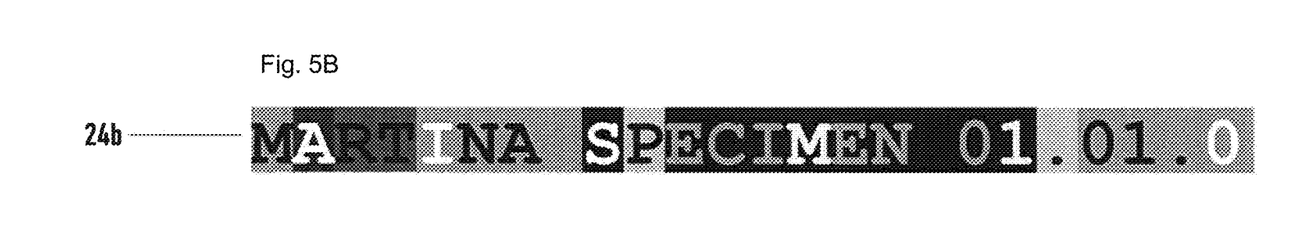

FIGS. 5A and 5B show examples of the depiction of part of the digitally coded security information in an information image region 24 depicted or displayed by the image reproduction device 10. In this information image region, part of the digitally coded security information is displayed/depicted in a visually perceptible manner for an operator or viewer of the image reproduction device 10 in such a manner that it is changeable in a time-dependent manner. In the example shown, at least part of the digitally coded security information is depicted in the form of an almost endlessly circulating sequence of numbers and letters, wherein the numbers and letters are depicted as moving or circulating continuously or cyclically through the information image region 24a, 24b from left to right (as seen by the viewer of the image reproduction device 10).

The color values of the depicted letters and numbers are different in part from one another and are likewise changed continuously, cyclically and/or in a position-dependent manner. Likewise, a background image region of the information image region has color values which are different from one another and which can be changed in a time-dependent manner, for example synchronously or asynchronously with a change in the color values of the depicted letters and/or numbers, and/or in a position-dependent manner. Optionally, the color values of the background image region can in each case be complementary to color values of the depicted numbers and letters which are depicted within the information image region.

Optionally, the depiction of letters, characters, pictograms, symbols and/or images can be changed, analogously to the information image region 24, also in the signature image region 26 and/or in at least one or more image regions in a time-dependent and/or operator-instigated manner. Furthermore, it can be provided that a time-dependent and/or operator-instigated change in a background color value is possible or is not possible for the signature image region 26 and/or for at least one or more image regions.

In a variant, the digitally coded security information of the digitally stored image can include a date and/or time information which can be depicted or displayed in the image regions and/or in the signature image region and/or in the information image region. An advantage thereof is that a reproduction reproduced by filming or in another unauthorized manner of digitally coded security information depicted in the past can easily be identified.

It will be appreciated that the exemplary embodiments described above are not exhaustive and do not limit the subject-matter disclosed herein. In particular, it is clear to the person skilled in the art that he can combine the described features with one another as desired and/or can omit different features without thereby departing from the subject-matter disclosed herein.

What is claimed is:

1. A method for rendering visible security information of a digitally stored image which has a plurality of pixels and at least one piece of digitally coded information, comprising the steps of:

allocating at least some of the pixels to at least one image region using a processor in an image reproduction device;

determining an average color value of the pixels allocated to the image region using the processor;

determining two mutually complementary color values whose average color value is at least approximately identical to the determined average color value of the pixels allocated to the image region using the processor; and depicting the image region and at least part of the digitally coded security information in a visually perceptible manner using a display element in the image reproduction device, wherein the depicted image region has a first of the mutually complementary color values, and the part of the digitally coded security information is depicted within the image region and has a second of the mutually complementary color values.

2. The method as claimed in claim 1, further comprising at least one of the steps of:

depicting the digitally stored image in a visually perceptible manner by the image reproduction device; or instigating the rendering visible of security information by an operator of the image reproduction device by an interaction of the user with the image reproduction device.

3. The method as claimed in claim 1, wherein at least part of the digitally coded security information is depicted in the form of a visually perceptible letter or in the form of a visually perceptible number, or at least part of the digitally coded security information is depicted in the form of a visually perceptible symbol image or in the form of a visually perceptible pictogram.

4. The method as claimed in claim 1, wherein in each case 10, 100 or 1000 pixels are allocated to an image region, or in each case a multiple of 10 pixels are allocated to one or more image regions, or at least part of the image regions has a longitudinal extent which is in each case at least approximately identical to the extent in terms of width of the respective image regions, or each pixel of the digitally stored image is allocated to at least one image region.

5. The method as claimed in claim 1, further comprising at least one of the steps of:

allocating at least some of the pixels to a signature image region;

determining a signature profile or line profile within the signature image region;

depicting the signature image region and at least part of the digitally coded security information in a visually perceptible manner within the signature image region, wherein the part of the digitally coded security information that is depicted within the signature image region has a plurality of visually perceptible letters or numbers or pictograms or symbol images, and the plurality of visually perceptible letters or numbers or pictograms or symbol images are arranged within the signature image region so as to follow the signature profile or line profile.

6. The method as claimed in claim 5, wherein the allocation of the pixels to the signature image region comprises a contrast analysis of the digitally stored image, or the determination of the signature profile or line profile comprises a contrast analysis of the signature image region, or the part of the security information that is depicted within the signature image region overlies a signature or fingerprint depiction that is depicted within the signature image region, or the part of the security information that is depicted within the signature image region has a color value which is complementary to a color value of a signature or fingerprint depiction depicted within the signature image region.

7. The method as claimed in claim 5, wherein at least part of the digitally coded security information is displayed in an information image region, wherein the part of the digitally coded security information that is depicted within the information image region has a plurality of visually perceptible letters or numbers or pictograms or symbol images.

8. The method as claimed in claim 7, wherein the information image region or the part of the digitally coded security information that is depicted within the information image region has a plurality of color values, in particular color values that are mutually complementary in pairs, or the part of the digitally coded security information that is depicted within the information image region is changed in a time-dependent or operator-instigated manner, or the color values of the information image region or of the part of the digitally coded security information that is depicted within the information image region are changed in a time-dependent or operator-instigated manner.

9. The method as claimed in claim 7, wherein the digitally coded security information, in particular the part of the security information that is depicted in the at least one image region or in the signature image region or in the information image region, includes time information.

10. An image reproduction device which is configured and adapted to depict a digitally stored image which has a plurality of pixels and at least one piece of digitally coded security information in a visually perceptible manner for an operator, and to reproduce at least part of the digitally coded security information in a visually perceptible manner for an operator by the method as claimed in claim 1.

* * * * *